(12) United States Patent
Lau et al.

(10) Patent No.: US 10,151,629 B2
(45) Date of Patent: Dec. 11, 2018

(54) SPECTRAL IMAGING SENSORS AND METHODS WITH TIME OF FLIGHT SENSING

(71) Applicants: Daniel L. Lau, Lexington, KY (US); Gonzalo R. Arce, Newark, DE (US)

(72) Inventors: Daniel L. Lau, Lexington, KY (US); Gonzalo R. Arce, Newark, DE (US)

(73) Assignee: University Of Delaware, Newark, DE (US)

( * ) Notice: Subject to any disclaimer, the term of this patent is extended or adjusted under 35 U.S.C. 154(b) by 0 days.

(21) Appl. No.: 15/559,228

(22) PCT Filed: Mar. 18, 2016

(86) PCT No.: PCT/US2016/023012
§ 371 (c)(1),
(2) Date: Sep. 18, 2017

(87) PCT Pub. No.: WO2016/149570
PCT Pub. Date: Sep. 22, 2016

(65) Prior Publication Data
US 2018/0080822 A1 Mar. 22, 2018

Related U.S. Application Data

(60) Provisional application No. 62/135,233, filed on Mar. 19, 2015.

(51) Int. Cl.
*G01J 3/28* (2006.01)
*G01J 3/02* (2006.01)
(Continued)

(52) U.S. Cl.
CPC .............. *G01J 3/0229* (2013.01); *G01J 3/10* (2013.01); *G01J 3/108* (2013.01); *G01J 3/2823* (2013.01);
(Continued)

(58) Field of Classification Search
CPC ........ G01J 3/28; G01J 3/00; G01J 3/02; G01J 3/44; G01N 21/65; G01N 21/64
See application file for complete search history.

(56) References Cited

U.S. PATENT DOCUMENTS

| | | |
|---|---|---|
| 7,888,626 B2 | 2/2011 | Slinger et al. |
| 2009/0040516 A1* | 2/2009 | Fritz ......................... G01J 3/02 356/301 |

(Continued)

FOREIGN PATENT DOCUMENTS

| | | |
|---|---|---|
| CN | 103472455 A | 12/2013 |
| CN | 103743482 A | 4/2014 |

OTHER PUBLICATIONS

International Preliminary Report on Patentability for International Application No. PCT/US2016/023012, dated Sep. 28, 2017—8 Pages.

(Continued)

*Primary Examiner* — Abdullahi Nur
(74) *Attorney, Agent, or Firm* — RatnerPrestia

(57) ABSTRACT

Spectral imaging sensors and methods are disclosed. One spectral imaging sensor includes a light source, an array of coded apertures, one or more optical elements, and a photodetector. The light source is configured to emit a plurality of pulses of light toward an object to be imaged. The array of coded apertures is positioned to spatially modulate light received from the object to be imaged. The optical elements are configured to redirect light from the array of coded apertures. The photodetector is positioned to receive light from the one or more optical elements. The photodetector comprise a plurality of light sensing elements. The plurality of light sensing elements are operable to sense the light from the one or more optical elements in a plurality of time (Continued)

periods. The plurality of time periods have a same frequency as the plurality of pulses of light.

20 Claims, 4 Drawing Sheets

(51) Int. Cl.
    *G01S 17/89*     (2006.01)
    *G01S 17/36*     (2006.01)
    *G01S 7/481*     (2006.01)
    *G01S 7/486*     (2006.01)
    *G01J 3/10*     (2006.01)

(52) U.S. Cl.
    CPC ........... *G01J 3/2889* (2013.01); *G01S 7/4816* (2013.01); *G01S 7/4863* (2013.01); *G01S 17/36* (2013.01); *G01S 17/89* (2013.01)

(56) References Cited

U.S. PATENT DOCUMENTS

| 2013/0234029 A1 | 9/2013 | Bikumandla |
| 2015/0028763 A1 | 1/2015 | Feri et al. |

OTHER PUBLICATIONS

International Search Report and Written Opinion for International Application No. PCT/US2016/023012, dated Jun. 10, 2016—8 Pages.

\* cited by examiner

SPECTRAL IMAGING SENSORS AND METHODS WITH TIME OF FLIGHT SENSING

CROSS REFERENCE TO RELATED APPLICATIONS

This application is a U.S. National Phase Application of PCT International Application PCT/US2016/023012, filed Mar. 18, 2016, which claims priority to U.S. Patent Application No. 62/135,233, entitled "Coded Aperture Snapshot Spectral Imager With Time of Flight Sensor," filed Mar. 19, 2015, the contents of which are incorporated herein by reference in their entirety for all purposes.

FIELD OF THE INVENTION

The present invention relates generally to spectral imaging, and more particularly, to spectral imaging sensors and methods employing time of flight sensing.

BACKGROUND OF THE INVENTION

In recent years, the ability to acquire spectral information for a field of view has become desirable in numerous applications. Such information can include a complete spectrum or just some spectral information at every location in an image plane. As such, spectral image sensors must be capable of obtaining a large amount of spatial information across a multitude of wavelengths in a field of view ("spatio-spectral information").

The acquisition of spatio-spectral information on its own, however, may be insufficient for certain applications. In particular, surface depth information may be desirable in addition to spectral information in order to recreate images in three spatial directions. Traditional spectral imaging sensing techniques have not been employed to collect surface depth information in addition to spectral information. Accordingly, improved spectral image sensors and spectral image sensing techniques are desired.

SUMMARY OF THE INVENTION

Aspects of the present invention are directed to spectral imaging sensors and methods.

In accordance with one aspect of the present invention, a spectral imaging sensor is disclosed. The spectral imaging sensor includes a light source, an array of coded apertures, one or more optical elements, and a photodetector. The light source is configured to emit a plurality of pulses of light toward an object to be imaged. The array of coded apertures is positioned to spatially modulate light received from the object to be imaged. The optical elements are configured to redirect light from the array of coded apertures. The photodetector is positioned to receive light from the one or more optical elements. The photodetector comprise a plurality of light sensing elements. The plurality of light sensing elements are operable to sense the light from the one or more optical elements in a plurality of time periods. The plurality of time periods have a same frequency as the plurality of pulses of light.

In accordance with another aspect of the present invention, a spectral imaging method is disclosed. The method includes emitting a plurality of pulses of light toward an objected to be imaged, spatially modulating light from the object to be imaged with an array of coded apertures, redirecting the spatially modulated light with one or more optical elements, and receiving the redirected light with a photodetector comprising a plurality of light sensing elements, the plurality of light sensing elements operated to sense the redirected light in a plurality of time periods, the plurality of time periods having a same frequency as the plurality of pulses of light.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Figure 1:
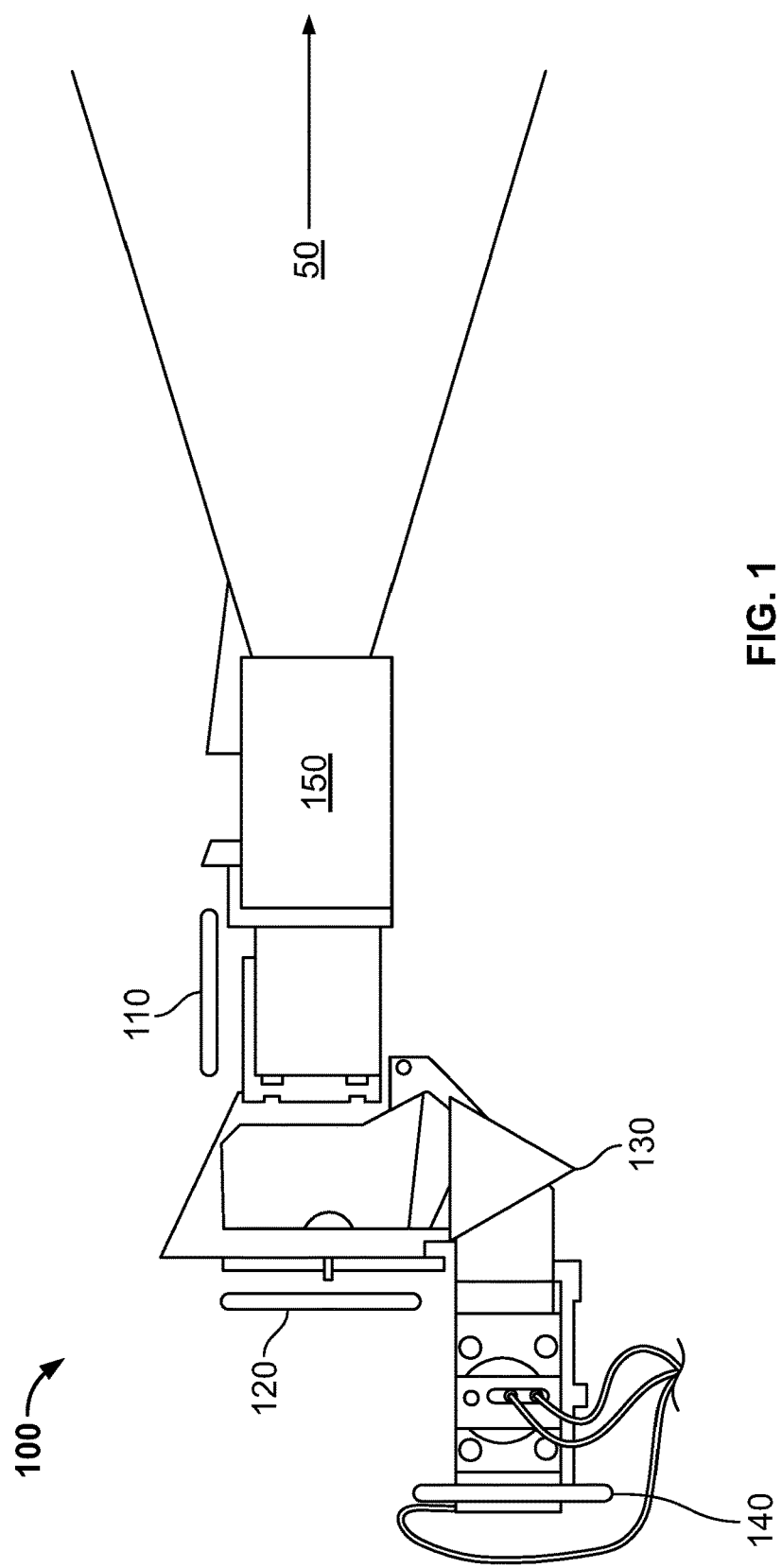
FIG. 1 is a diagram illustrating an exemplary spectral imaging sensor in accordance with aspects of the present invention.
Figure 2:
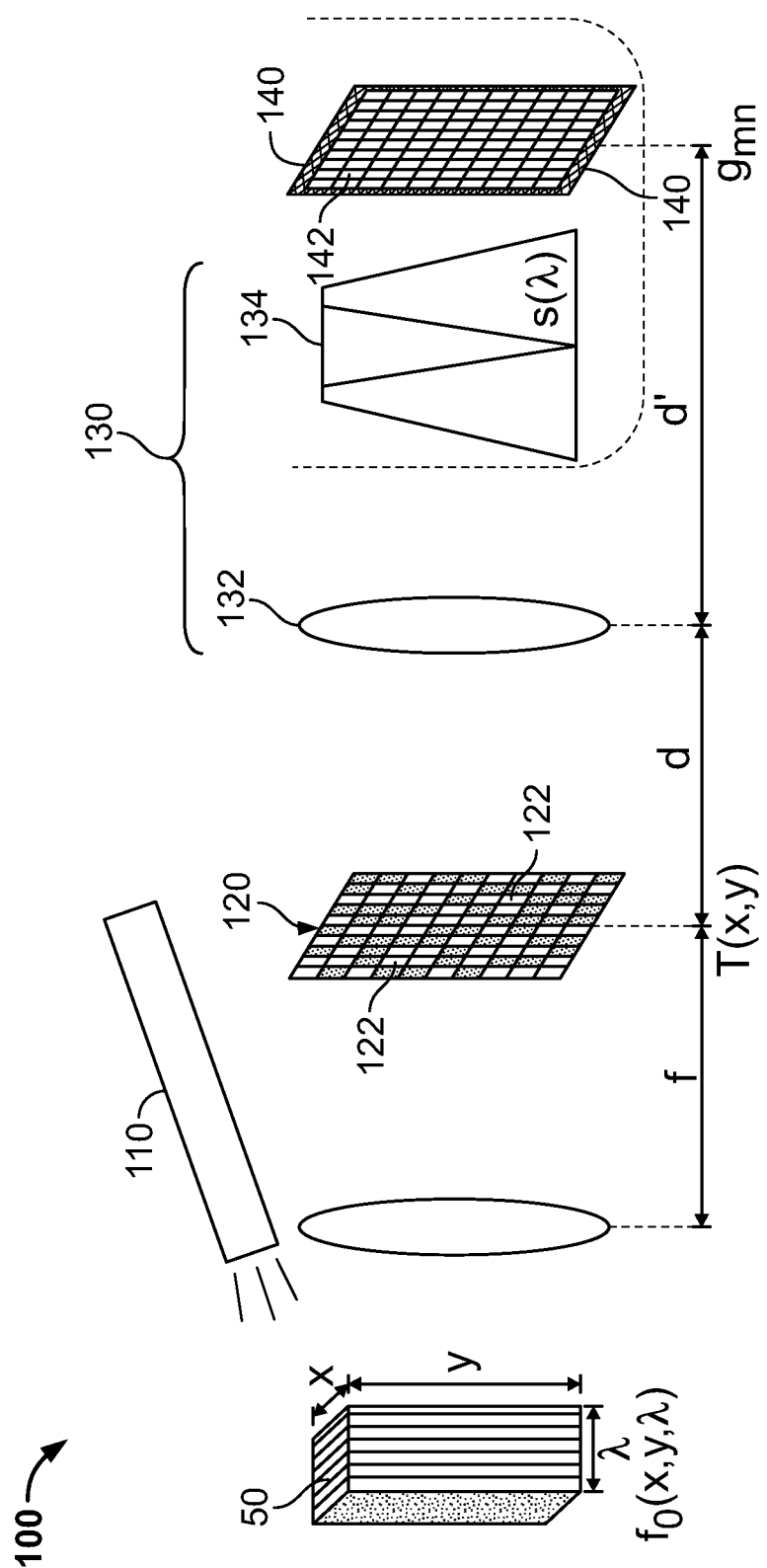
FIG. 2 is a diagram illustrating an optical path of the exemplary sensor of FIG. 1.

With reference to the drawings, FIGS. 1 and 2 illustrate an exemplary spectral imaging sensor 100 in accordance with aspects of the present invention. Sensor 100 may be usable in photographic or spectroscopic systems. In general, sensor 100 includes a light source, an array 120 of coded apertures, optical elements 130, and a photodetector 140. Additional details of sensor 100 are described below.

Light source 110 is configured to emit light toward the object 50 to be imaged. Light source 110 operates by emitting a plurality of pulses of light. During pulsing, light source 110 may be operated with a 50% duty cycle (e.g., light source is on and off for the same period of time). Suitable frequencies for pulsing light source 110 include from 10 to 80 MHz (i.e. with a pulse length from 0.1 to 0.0125 μs).

In an exemplary embodiment, light source 110 is a laser diode. Suitable laser diodes for use as light source 110 include, for example, near-infrared laser diodes. Other suitable light sources will be known to one of ordinary skill in the art from the description herein.

An array 120 of coded apertures is positioned to receive light from object 50. Array 120 receives both ambient light reflected by object 50 and light emitted by light source 110 and reflected by object 50. Array 120 is formed from a two-dimensional array of coded apertures 122, and is configured to spatially modulate light from object 50. Array 120 thus represents a 3D array, where the two axes orthogonal to the light from object 50 represent a spatial distribution, and the third axis parallel to the light from object 50 represents a distribution of spatial modulation results from apertures 122.

As used herein, the term "spatial modulation" is intended to encompass a number of different operations performed on the light from object 50 by apertures 122. A number of non-limiting examples of such modulation are set forth below. Apertures 122 may allow all of the light from object 50 to pass therethrough. Apertures 122 may allow a portion of the light from object 50 to pass therethrough. Apertures 122 may absorb or reflect a portion of the light from object 50. In dynamic embodiments, apertures 122 may be controlled to absorb or pass all or a portion of the light from object 50. Apertures 122 may also be controlled to redirect the light from object 50 in one or more different directions. Other examples of spatial modulation performed by apertures 122 will be known to one of ordinary skill in the art from the description herein. As a result of the modulation, array 120 of coded apertures produces (either by passing or reflecting/redirecting) a beam of spatially modulated light from object 50.

In one exemplary embodiment, array 120 is an array of static coded apertures. In this embodiment, the spatial modulation by each aperture 122 does not change. The array of static coded apertures may be, for example, a color-coded array of apertures. Such an array may include a first plurality of apertures configured to pass light in a first predetermined wavelength range and a second plurality of apertures configured to pass light in a second predetermined wavelength range different from the first predetermined wavelength range. It may further be preferable that all wavelength ranges incorporated by apertures in the color-coded array be designed to pass a wavelength band including the light from light source 110, so that no reflected light from light source 110 is blocked from reaching photodetector 140.

Suitable color-coded arrays for use as array 120 are described in U.S. patent application Ser. No. 14/270,929, entitled "SPECTRAL IMAGING SENSORS AND METHODS," filed May 6, 2014, the contents of which are incorporated herein by reference in their entirety for all purposes.

In another exemplary embodiment, array 120 is an array of dynamic coded apertures. In this embodiment, the spatial modulation by each aperture 122 may be changed (e.g., through electronic or mechanical adjustment). The array of dynamic coded apertures may be produced, for example, by a spatial light modulator. A spatial light modulator (such as a liquid crystal on-silicon modulator or a liquid crystal phase-only modulator) is a modulator that imposes a spatially varying modulation on a beam of light. The modulation of light through each aperture may binary (e.g. on/off) or may be continuously varying (e.g. from 0-100% intensity) at each location (or aperture). The modulation may be controlled by a computer or other digital processing element. Suitable spatial light modulators for use as array 120 will be known to one of ordinary skill in the art from the description herein.

The array of dynamic coded apertures may also be, for example, a digital mirror device. A digital micromirror device includes an array of individually controllable microscopic mirrors that impose a spatially varying reflection on a beam of light. The reflection may be toward a desired optical element (e.g. lens) or may be out of the intended optical path (e.g. to a heat sink) at each location (or aperture). The direction of reflection may be controlled by a computer or other digital processing element. Suitable digital micromirror devices for use as array 120 will be known to one of ordinary skill in the art from the description herein.

Optical elements 130 are positioned to receive light spatially modulated by array 120. Optical elements 130 are configured to redirect the light from array 120 onto photodetector 140.

In an exemplary embodiment, optical elements 130 include an imaging lens 132 and one or more prisms 134, as shown in FIG. 2. Imaging lens 132 focuses the light from array 120, and prisms 134 refract the light passing through imaging lens 132. In an exemplary embodiment, prisms 134 are an Amici prism, as shown in FIG. 2. Suitable lenses and prisms for use as optical elements 130 will be known to one of ordinary skill in the art from the description herein.

Refraction of the light with prisms 134 separates the different wavelength bands of light modulated by array 120. This is because the amount of refraction caused by prisms 134 is dependent on the wavelength of the light passing therethrough. In other words, prisms 134 will refract longer wavelength (e.g. red) light to a greater extent than they will shorter wavelength (e.g. blue) light. Due to this refraction, prisms 134 will cause different wavelengths of light from the same region of object 50 to strike photodetector 140 at different locations (due to the different amounts of refraction). Where photodetector 140 is a photodetector array of light sensing elements (e.g. pixels), each element will receive spectral information about object 50 from differential spatial areas of the light from object 50.

Optical elements 130 are not limited to the elements described herein. Other suitable optical elements for use in sensor 100 will be known to one of ordinary skill in the art from the description herein. For example, suitable optic elements include diffractive elements such as gratings. Other suitable elements for use as optical elements 130 will be known to one of ordinary skill in the art from the description herein.

Where array 120 is designed to reflect light (such as a digital mirror device), it may be desirable that optical elements 130 include a beam splitter. In one embodiment, a beam splitter would allow light from object 50 to pass therethrough to array 120, and then reflect light from array toward other optical elements 130 and/or photodetector 140. In other embodiments, the beam splitter would reflect light from object 50 onto array 120, and allow light reflected by array 120 to pass therethrough on toward other optical elements 130 and/or photodetector 140. Suitable structures for use as a beam splitter will be known to one of ordinary skill in the art from the description herein.

Photodetector 140 is positioned to receive light from optical elements 130. Photodetector 140 collects the light passing from array 120 and converts it into spatio-spectral image information and surface depth information about object 50. Photodetector 140 may be configured to detect light in any region of the optical electromagnetic spectrum. In particular, photodetector 140 collects both ambient light reflected by object 50 and light emitted by light source 110 and reflected by object 50. Data relating to these separate types of light may be processed and stored separately by photodetector 140 (and related processing elements).

In an exemplary embodiment, photodetector 140 comprises a plurality of light sensing elements 142, as shown in FIG. 2. The light sensing elements 142 may be an array of pixels, such as a focal plane array. Suitable pixel arrays will be known to one of ordinary skill in the art from the description herein.

Light sensing elements 142 sense the light modulated by array 120 and redirected by optical elements 130. Light sensing elements 142 are operated to sense this light in a plurality of separate time periods. Conventional pixel arrays obtain an image during a single time period. In such an operation (known as shuttering), each pixel is turned on for a predetermined time period, and then turned off. Light sensing elements 142, by contrast, are turned on and off a plurality of times to obtain information used to create an image. The plurality of time periods in which light sensing elements 142 sense light are each shorter than the single time period for conventional pixel arrays, and may collectively cover approximately the same length of time as the single time period for conventional pixel arrays (e.g., 15.0 ms). Suitable image sensors for use as photodetector include, for example, the image sensor of the epc660 3D Time-of-Flight QVGA Imager, provided by ESPROS Photonics Corporation. Other suitable photodetectors will be known to one of ordinary skill in the art from the description herein.

To turn each light sensing element 142 on and off (to generate the separate time periods), each light sensing element 142 is connected to a processing element (not shown). The processing element(s) may actuate all of the light sensing elements 142 together (in phase), or may subdivide the light sensing elements 142 into sections, columns, or rows, and actuate each subdivision of light sensing elements 142 according to its own timing. A single processing element may individually actuate all of the light sensing elements 142, or multiple processing elements may be used (e.g. one for each section, column, or row of light sensing elements).

Suitable processing elements (as well as optical elements) may be found, for example, in the DME660 3D Time-of-Flight camera, also provided by ESPROS Photonics Corporation. Other suitable processing elements will be known to one of ordinary skill in the art from the description herein.

The plurality of time periods in which light sensing elements 142 sense light have the same frequency as the pulses of light emitted by light source 110. In other words, light sensing elements 142 sense light in a pulsed fashion, similar to the pulsing of light source 110. Light sensing elements 142 may sense light with a 50% duty cycle, and at the same frequency or pulse length recited above for the light pulses from light source 110. In a further embodiment, the pulses of light from light source 110 are timed to be emitted in phase with the time periods of light sensing elements 142.

Figure 3:
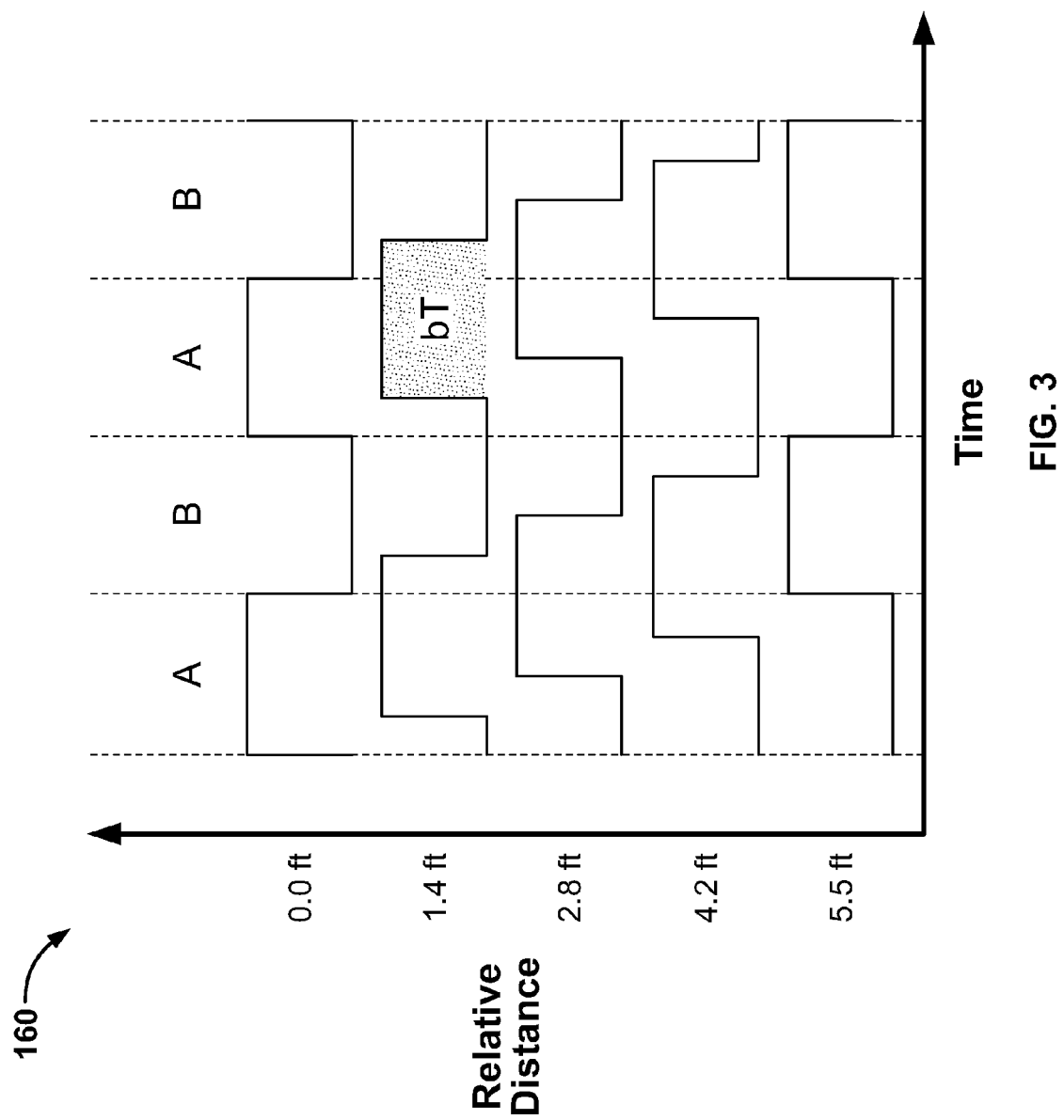
FIG. 3 is a timing diagram illustrating the operation of a photodetector of the exemplary sensor of FIG. 1.

The interaction between pulses from light source 110 and time periods of light sensing elements 142 will now be described with respect to FIG. 3. FIG. 3 is a timing diagram 160 illustrating the operation of photodetector 140. The x-axis of FIG. 3 represents time; the y-axis of FIG. 3 represents an estimated range relative to object 50 from a predetermined point. As pulses of light from light source 110 are received by photodetector 140, they will overlap with the time periods of sensing by light sensing elements 142.

The columns labeled A and B in FIG. 3 represent two groups of light sensing elements 142, or pixels. A pixels are timed to collect light when light source 110 is turned on, while B pixels are timed to collect light when the light source 110 is turned off. A pixels and B pixels may be groups of different pixels. Alternatively, A pixels and B pixels may include the same pixels of photodetector 140. In this embodiment, each pixel is switched between a first electron collection region (e.g., an A capacitor) and a second electron collection region (e.g., a B capacitor). Thus, each pixel may produce two separate values of light received for A and B.

As shown in FIG. 3, the top row of pulses overlap perfectly with the on period for the A pixels; in other words, the entire pulse is received by photodetector 140 when the A pixels are on. Because the light pulses and time periods share the same frequency, this relationship is maintained over a series of pulses. In the next row down, there is a short lag between the start of the on time period for the A pixels and receipt of the light pulse (resulting from the light Pulse travelling a longer distance to object 50). As a result, less than the entire pulse is received by photodetector 140 within the on time period of the A pixels. This relationship is continued down the diagram of FIG. 3; the longer the distance traversed by the light pulse to the object, the less of the light pulse is received during the on time period of the A pixels, and the more of the light pulse is received during the on time period of the B pixels. This trend continues until the bottom of FIG. 3, in which the entire light pulse is received during the on time period of the B pixels. By looking at the ratio of pixel values A and B, one can derive both the total ambient light strength as well as the pulse laser light as separate quantities. And depending on how the strength of laser light is distributed between A and B, one can determine what the round trip travel delay was (knowing the speed of light pulses from light source 110), and from that, the relative surface depth of the features of object 50 from the sensor may be calculated. The resolution of this surface depth information may be controlled, in part, based on the frequency of pulses and time periods A and B.

It will be understood by one of ordinary skill in the art that sensor 100 is not limited to the above-described components, but may include alternative or additional components as would be understood to one of ordinary skill in the art.

For example, sensor 100 may include an objective lens 150, as shown in FIG. 2. Objective lens 150 is positioned to receive the light from object 50, and is positioned between object 50 and array 120 of coded apertures. Objective lens 150 thereby functions to focus light from object 50 onto array 120 of coded apertures. Objective lens 150 focuses both ambient light reflected by object 50 and light emitted by light source 110 and reflected by object 50.

The relative distances between each of the components of sensor 100 will be readily ascertainable by one of ordinary skill in the art from the description herein. In particular, the distance f illustrated in FIG. 2 directly depends on the used objective lens. This relates to the focal length from the lens to the plane where the optical images are formed (i.e., the image plane of the objective lens). The distance d illustrated in FIG. 2 is usually given by the equation d=2f, where f is the focal length of the imaging lens. Similarly, d' is given by the equation d'=2f+f', where f' is the induced focal length of the dispersive element.

Sensor 100 may also include an adjustment mechanism. In an exemplary embodiment, the adjustment mechanism is configured to adjust a position of array 120 relative to object 50. The adjustment mechanism may be configured to move array 120 orthogonally to the light from object 50 by a predetermined number of apertures. Such movement may be particularly useful for arrays of static coded apertures, in order to adjust the modulation by the array. Alternatively, the adjustment mechanism may be configured to adjust a position of the one or more optical elements 130 relative to object 50. Suitable adjustment mechanisms will be known to one of ordinary skill in the art from the description herein.

Figure 4:
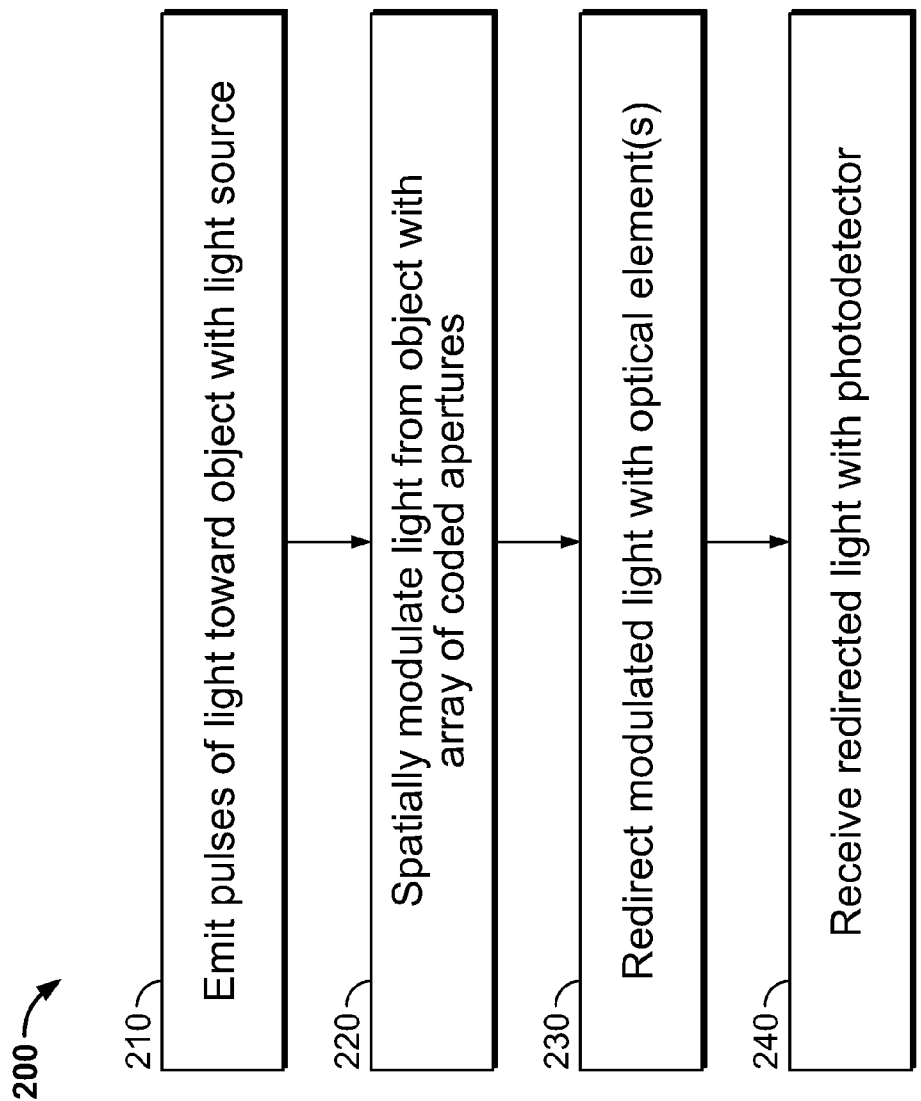
FIG. 4 is a flowchart illustrating an exemplary spectral imaging method in accordance with aspects of the present invention.

FIG. 4 illustrates an exemplary method 200 for spectral imaging in accordance with aspects of the present invention. Method 200 may be usable for photographic or spectroscopic imaging. In general, method 200 includes emitting light, spatially modulating light with an array of coded apertures, redirecting the spatially modulated light, and receiving the redirected light. Additional details of method 200 are described below with respect to the components of sensor 100.

In step 210, light is emitted from a light source. In an exemplary embodiment, a plurality of light pulses are emitted by light source 110. The light pulses may be emitted at a 50% duty cycle. The light pulses may be emitted at a frequency from 10 to 80 MHz (i.e. with a pulse length from 0.1 to 0.0125 µs).

In step 220, light from an object to be imaged is spatially modulated. In an exemplary embodiment, light from object 50 is spatially modulated by array 120 of coded apertures. Array 120 is positioned to receive light from object 50 and spatially modulate that light. In one embodiment, the light from object 50 may be statically spatially modulated with an array of static coded apertures. In another embodiment, the light from object 50 may be dynamically spatially modulated with an array of dynamic coded apertures.

In step 230, the spatially modulated light is redirected. In an exemplary embodiment, optical elements 130 redirect the spatially modulated light from array 120. For example, one or more prisms 134 may refract the modulated light in order to separate the light modulated by array 120 into different wavelength bands.

In step 240, the redirected light is received. In an exemplary embodiment, photodetector 140 receives the light redirected by optical elements 130. Where photodetector 140 includes a plurality of light sensing elements 142, the light sensing elements are operated to sense the redirected light in a plurality of separate time periods. The plurality of time periods in which light sensing elements 142 sense light have the same frequency as the pulses of light emitted by light source 110. In a further embodiment, the pulses of light are emitted in phase with the time periods of light sensing elements 142.

It will be understood by one of ordinary skill in the art that method 200 is not limited to the above-described steps, but may include alternative or additional components as would be understood to one of ordinary skill in the art.

For example, a spectral three-dimensional image may be created. In an exemplary embodiment, photodetector 140 converts the light modulated by array 120 and redirected by optical elements 130 into spatio-spectral image information and surface depth information about object 50. This information may then utilized by photodetector 140, along with several processing elements (not shown) to create a spectral three-dimensional image of object 50. Suitable algorithms for creating a spectral three-dimensional image from the spatially modulated light received by photodetector 140 will be known to one of ordinary skill in the art from the description herein.

For another example, sensor 100 may include an objective lens 150, as shown in FIG. 2. In this embodiment, method 200 may include the step of focusing the light from object 50 onto array 120 of apertures with objective lens 150.

For yet another example, the light received with photodetector 140 may be processed. In one embodiment, such processing may include a step of separating ambient light from object 50 and modulated light reflected from object 50. The ambient light may be processed in accordance with compressive sensing in order to procure spatio-spectral image information regarding object 50. Likewise, the modulated light may be processed as set forth above to obtain surface depth information regarding object 50.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A spectral imaging sensor comprising:
a light source configured to emit a plurality of pulses of light toward an object to be imaged;
an array of coded apertures positioned to spatially modulate light received from the object to be imaged;
one or more optical elements configured to redirect light from the array of coded apertures; and
a photodetector positioned to receive light from the one or more optical elements, the photodetector comprising an array of light sensing elements, each of the light sensing elements configured to sense the light from the one or more optical elements throughout a same spectral region and in a plurality of time periods, the plurality of time periods having a same temporal frequency as the plurality of pulses of light.

2. The spectral imaging sensor of claim 1, wherein the light source is a laser diode.

3. The spectral imaging sensor of claim 2, wherein the laser diode is an infrared laser diode.

4. The spectral imaging sensor of claim 1, further comprising a lens positioned to receive the light from the object to be imaged, the lens positioned between the object to be imaged and the array of coded apertures.

5. The spectral imaging sensor of claim 1, wherein the array of coded apertures is an array of static coded apertures.

6. The spectral imaging sensor of claim 5, wherein the array of static coded apertures is a color-coded array including a first plurality of apertures configured to pass light in a first predetermined wavelength range and a second plurality of apertures configured to pass light in a second predetermined wavelength range different from the first predetermined wavelength range.

7. The spectral imaging sensor of claim 1, wherein the array of coded apertures is an array of dynamic coded apertures.

8. The spectral imaging sensor of claim 7, wherein the array of dynamic coded apertures is a spatial light modulator.

9. The spectral imaging sensor of claim 7, wherein the array of dynamic coded apertures is a digital mirror device.

10. The spectral imaging sensor of claim 7, wherein the array of dynamic coded apertures is a liquid crystal phase-only modulator.

11. The spectral imaging sensor of claim 7, wherein the array of dynamic coded apertures is a liquid crystal on-silicon modulator.

12. The spectral imaging sensor of claim 1, wherein the one or more optical elements comprise one or more prisms configured to refract the light from the array of coded apertures.

13. The spectral imaging sensor of claim 12, wherein the one or more prisms comprise an Amici prism.

14. The spectral imaging sensor of claim 1, wherein the plurality of pulses of light are in phase with the plurality of time periods of the light sensing elements.

15. A spectral imaging method comprising the steps of:
emitting a plurality of pulses of light toward an objected to be imaged;
spatially modulating light from the object to be imaged with an array of coded apertures;
redirecting the spatially modulated light with one or more optical elements; and receiving the redirected light with a photodetector comprising an array of light sensing elements, each of the light sensing elements configured to sense the redirected light throughout a same spectral region and in a plurality of time periods, the plurality of time periods having a same temporal frequency as the plurality of pulses of light.

16. The spectral imaging method of claim 15, further comprising focusing the light from the object to be imaged onto the array of coded apertures.

17. The spectral imaging method of claim 15, wherein the spatially modulating comprises statically spatially modulating the light with an array of static coded apertures.

18. The spectral imaging method of claim 15, wherein the spatially modulating comprises dynamically spatially modulating the light with an array of dynamic coded apertures.

19. The spectral imaging method of claim 1, wherein the redirecting comprises refracting the spatially modulated light with one or more prisms.

20. The spectral imaging method of claim 15, wherein the plurality of pulses of light are emitted in phase with the plurality of time period of the light sensing elements.

* * * * *